(12) United States Patent
Boury et al.

(10) Patent No.: US 7,670,112 B2
(45) Date of Patent: Mar. 2, 2010

(54) TURBINE BLADE WITH COOLING AND WITH IMPROVED SERVICE LIFE

(75) Inventors: Jacques Auguste Amedee Boury, Saint Ouen En Brie (FR); Patrice Eneau, Moissy Cramayel (FR); Guy Moreau, Yerres (FR)

(73) Assignee: SNECMA, Paris (FR)

( * ) Notice: Subject to any disclaimer, the term of this patent is extended or adjusted under 35 U.S.C. 154(b) by 512 days.

(21) Appl. No.: 11/566,423

(22) Filed: Dec. 4, 2006

(65) Prior Publication Data
US 2007/0128036 A1    Jun. 7, 2007

(30) Foreign Application Priority Data
Dec. 5, 2005    (FR)    ................................... 05 12297

(51) Int. Cl.
*F01D 5/08*    (2006.01)
(52) U.S. Cl. .................... 416/97 R; 416/96 R
(58) Field of Classification Search ................. 415/115; 416/96 R, 97 R
See application file for complete search history.

(56) References Cited

U.S. PATENT DOCUMENTS

| 4,767,268 | A |   | 8/1988 | Auxier et al. |
| 4,770,608 | A |   | 9/1988 | Anderson et al. |
| 5,246,340 | A | * | 9/1993 | Winstanley et al. ....... 416/97 R |
| 5,263,820 | A | * | 11/1993 | Tubbs ....................... 416/97 R |
| 5,356,265 | A |   | 10/1994 | Kercher |
| 5,720,431 | A |   | 2/1998 | Sellers et al. |
| 6,129,515 | A | * | 10/2000 | Soechting et al. ......... 416/97 R |
| 6,206,638 | B1 |  | 3/2001 | Glynn et al. |
| 6,368,060 | B1 |  | 4/2002 | Fehrenbach et al. |
| 6,607,356 | B2 | * | 8/2003 | Manning et al. .......... 416/97 R |

FOREIGN PATENT DOCUMENTS

EP    1 008 724 B1    4/2005

* cited by examiner

*Primary Examiner*—Edward Look
*Assistant Examiner*—Ryan H Ellis
(74) *Attorney, Agent, or Firm*—Oblon, Spivak, McClelland, Maier & Neustadt, L.L.P.

(57) ABSTRACT

A turbine blade, including an intrados wall, an extrados wall, at least one first radial trailing edge cavity, at least one second radial cavity upstream of the trailing edge cavity, an internal wall separating the radial cavities and with at least one channel connecting the cavities to one another, the channel being oriented in an axis intersecting the internal surface of the intrados wall.

10 Claims, 3 Drawing Sheets

TURBINE BLADE WITH COOLING AND WITH IMPROVED SERVICE LIFE

BACKGROUND OF THE INVENTION

The present invention relates to the field of turbine blades, in particular a turbine blade of a turbo machine with cooling and with an improved service life.

DESCRIPTION OF THE PRIOR ART

An aeronautical turbo machine traditionally comprises a compressor, a combustion chamber and a turbine. The role of the turbine is to ensure the rotational driving of the compressor by taking a part of the pressure energy of the hot gases exiting from the combustion chamber and by converting this into mechanical energy.

An axial turbine traditionally comprises at least one distributor, constituted by a grille of stationary blades in relation to the casing of the turbo machine, and at least one moving wheel, consisting of a plurality of blades capable of being set in rotation, positioned behind the distributor.

The turbine, situated downstream of the combustion chamber, is the element of the turbo machine that operates under the most severe conditions. In particular, it is subjected to considerable thermal stresses generated by the hot gases as they emerge from the chamber.

The resistance of the turbine to thermal stresses represents the most important limit on the function of the turbo machine. This limit determines the maximum flow of fuel that may be injected into the combustion chamber of the turbo machine and the maximum thrust that may be obtained from a turbo machine. The thermal resistance of the turbine depends on the temperature endured by the blades. Each temperature has an associated corresponding service life of the turbine, and this service life is reduced as the temperature increases. The existing solutions to improve the thermal resistance of the turbine blades essentially involve improving their constituent materials and cooling them in the course of their function.

Traditionally, cooling of the wall of a turbine blade is effected by the exchange of calories between the hot gases and the air circulating in the interior of the blade, and more precisely by the forced convection of cooling air onto the internal walls of the blade. In order to achieve this, the design of turbine blades with radial cooling cavities, inside which cooling air flows, is previously disclosed. This cooling air in contact with the hot walls of the radial cavities creates a different thermal exchange on each of them and, in particular, between the intrados walls and the extrados walls.

Document EP1008724 depicts, in FIG. 6, an example of a turbine blade comprising a plurality of radial cavities. These radial cavities are able to communicate between one another at their extremities in order to form a cooling circuit described as being of serpentine form. For example, the cooling circuit 36 delimited by the walls 34 and comprising an inlet 36A and a terminal extremity 36B, consists of three radial cavities communicating via return channels 37A and 37B.

The radial cavities may also communicate between one another via channels that are appreciably smaller than the return channels. The narrowness of these channels permits the cooling air to be projected under pressure in such a way as to favor thermal exchanges by convection. For example, in FIGS. 5 and 6 of document EP1008724, a trailing edge cavity 72 and a cavity 41B upstream of this, separated by a wall 75, communicate with one another via channels 74 located in the wall 75.

This configuration of the channels 74 is not satisfactory, however, since the cooling air originating from the upstream cavity 41B via the channels 74 is distributed very poorly in the trailing edge cavity 72, and in particular a large thermal gradient exists between the intrados wall and the extrados wall of this trailing edge cavity 72.

In fact, the flow of the hot gases originating from the combustion chamber gives rise to an unequal distribution of the temperatures on the intrados and the extrados of the turbine blades. The hot gases arrive directly on the intrados wall of the turbine blades. Thus, the intrados of a turbine blade is subjected to higher temperatures than its extrados, the consequence of which is to generate a thermal gradient between the walls of the intrados and the extrados producing an adverse effect on the service life of the blade.

Other documents relating to the prior art also depict turbine blades exhibiting the same defect, and in particular documents U.S. Pat. Nos. 4,767,268, 5,356,265, 5,720,431 and 6,206,638. As indicated by all these documents, blades having a similar configuration, that is to say with a first radial trailing edge cavity and a second radial cavity upstream of this, separated by an internal wall provided with channels, systematically have channels of which the axis is oriented in a direction parallel to a tangent to a portion of the camber surface of the blade running transversely to the internal wall. In FIG. 2 of the present application, the camber surface 11 of the blade, also referred to as the framework or the median line, is the line constituted by the entirety of the points that are equidistant from the intrados 2 and the extrados 3.

In this configuration, the air is distributed very poorly in the first trailing edge cavity 4. The narrowness of the leakage cavity 4 and the distribution of air in a plane coinciding at the camber surface 11 give rise to a thermal exchange on the internal surface 42 of the intrados wall 2 adjacent to the internal surface 43 of the extrados wall 3. This disadvantage is accentuated by the fact that the camber surface 11 at the level of the second cavity 5 is situated in the prolongation of the axes of the channels 8.

Mechanically, a turbine blade possesses a good service life if its two intrados 2 and extrados 3 walls exhibit a similar metal temperature, that is to say a weak thermal gradient. The thermal exchange of the external hot gases to a cavity is greater at the intrados 2 than at the extrados 3. Also, to compensate for this phenomenon and to present a weak thermal gradient, it is necessary to provide intensive cooling of the internal surface 42 of the intrados wall 2 in the first radial trailing edge cavity 4, as proposed by the invention.

In order to resolve this problem, a turbine blade has been proposed, for example in documents U.S. Pat. Nos. 6,368,060 and 4,770,608, comprising an intrados wall, an extrados wall, at least one first radial trailing edge cavity, at least one second radial cavity upstream of the trailing edge cavity, an internal wall separating the radial cavities and including at least one channel linking the cavities together, the said channel being oriented in an axis intersecting the internal surface of the intrados wall in the first radial trailing edge cavity.

SUMMARY OF THE INVENTION

The object of the present invention is to optimize the distribution of the cooling air in a turbine blade in order to improve its service life.

A turbine blade of the kind described above is proposed for this purpose, additionally comprising, upstream and downstream, advantageous connections with the walls of the improved cavities. The latter are described in greater detail below.

Advantageously, the said axis is inclined at an angle of between 5° and 70° in relation to a tangent to a portion of a camber surface of the blade, the said portion of the camber surface being located in the interior of the channel. By preference, this angle α lies in the range between 5° and 35°.

Advantageously, the present invention is applicable equally well to a stationary turbine blade as it is to a moving turbine blade.

The present invention also relates to a turbine containing at least one such blade, as well as a turbo machine containing one such turbine.

DESCRIPTION OF THE DRAWINGS

The invention will be more readily understood, and other characteristics and advantages of the invention will be appreciated from reading the rest of the description, which is provided by way of non-restrictive example, with reference to the accompanying drawings, which illustrate respectively.

DESCRIPTION OF THE PREFERRED EMBODIMENTS

Figure 1:
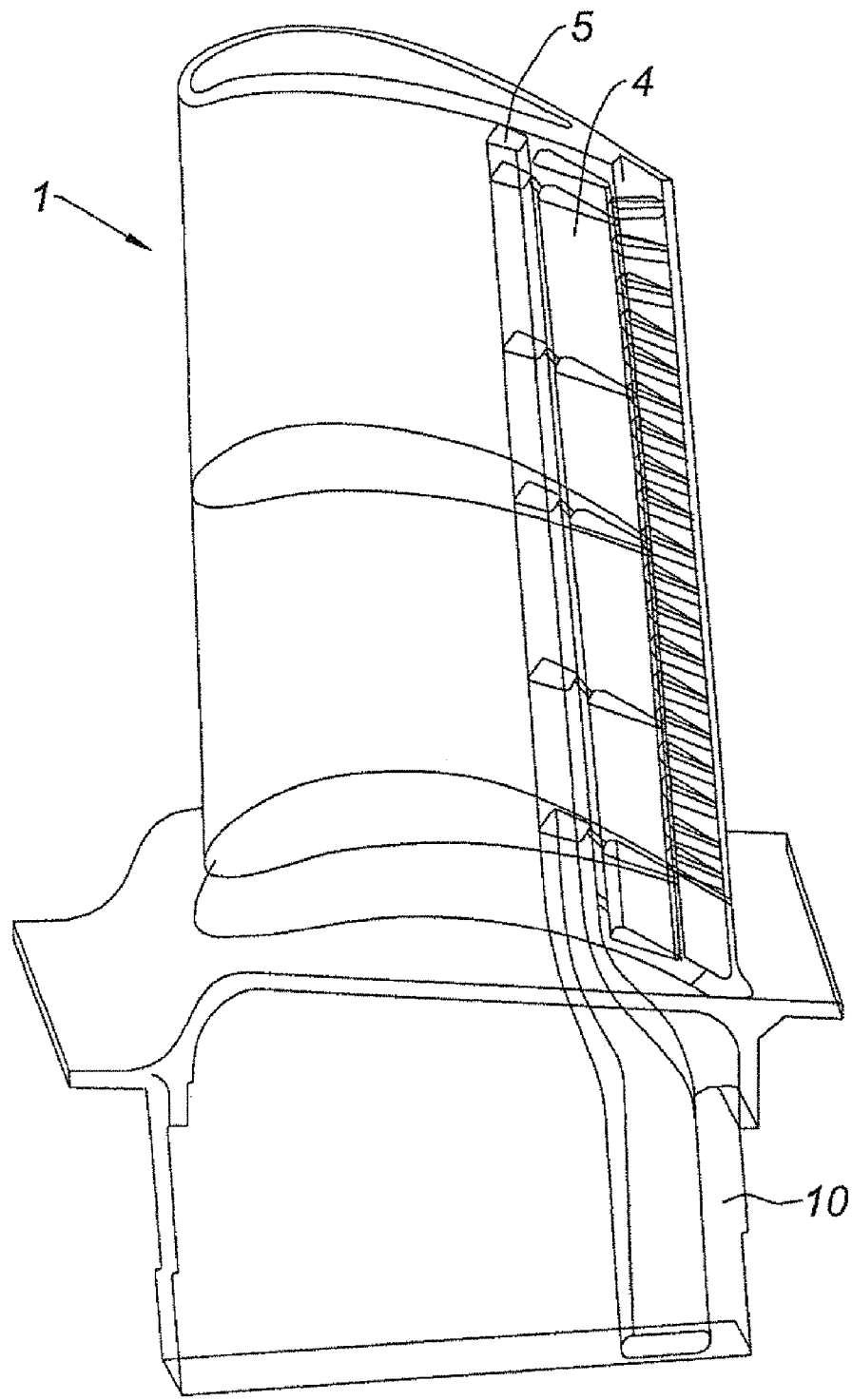
FIG. 1; a perspective view of a blade according to the invention.
Figure 2:
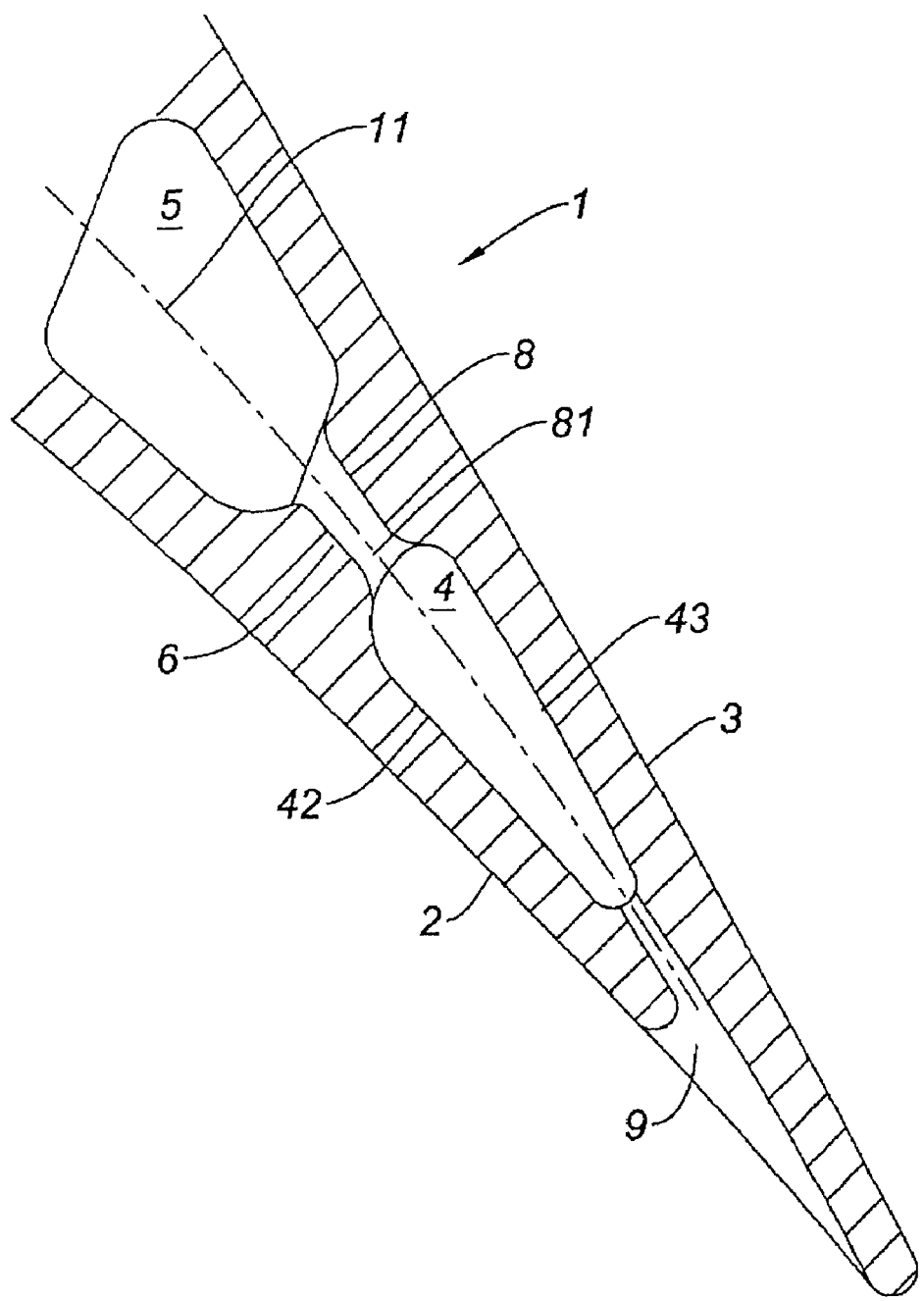
FIG. 2; a partial view of a blade sectioned in a plane perpendicular to a radial axis.

FIG. 1 depicts a moving blade 1 of a turbine comprising an intrados wall 2 and an extrados wall 3, as well as a plurality of radial cavities 4 and 5. The expression radial cavity is used here to denote a cavity arranged along a radius arising from the axis of rotation of the turbo machine when the blade is duly mounted on the turbo machine. An axis described as radial is an axis which coincides with such a radius. Only two radial cavities 4 and 5, situated downstream in relation to the flow of air around the blade 1, are represented in the present FIG. 1. It is possible to distinguish here, on the one hand, a first radial cavity 4, situated in direct proximity to the trailing edge of the blade, known as the trailing edge cavity, and, on the other hand, a second adjacent radial cavity 5 situated upstream of the first radial trailing edge cavity 4. These two radial cavities 4 and 5 are separated by an internal wall 6 containing a plurality of channels 8, as depicted in FIG. 2.

Cooling of the second radial cavity 5 is assured by a supply of cooling air injected via the foot 10 of the blade 1. Cooling of the first radial trailing edge cavity 4 is assured by this same cooling air, which passes through the channels 8. The cooling air is then expelled to the outside of the blade 1 via outlet channels 9.

The channels 8 of the internal wall 6, as well as the radial cavities 4 and 5, may be produced by a lost wax casting method that is already familiar to a person skilled in the art.

These channels 8 very often have a section of oblong form running in a radial direction. Sections of the channel 8 having other forms are possible. The axis 81 of a channel 8, that is to say the straight line perpendicular to the plane of the section and passing through the center of the section, defines the desired direction of flow of the cooling air as it leaves the channel 8. The axis of the channels 8 is perpendicular to a radial direction, however. By approximation in FIG. 2, a tangent to a portion of the camber surface 11, passing via the internal wall 6, is comparable to the axis 81 of the channel 8. The tangent to the portion of the camber surface 11 passing through the internal wall 6 thus intersects this wall 6 perpendicularly.

Figure 3:
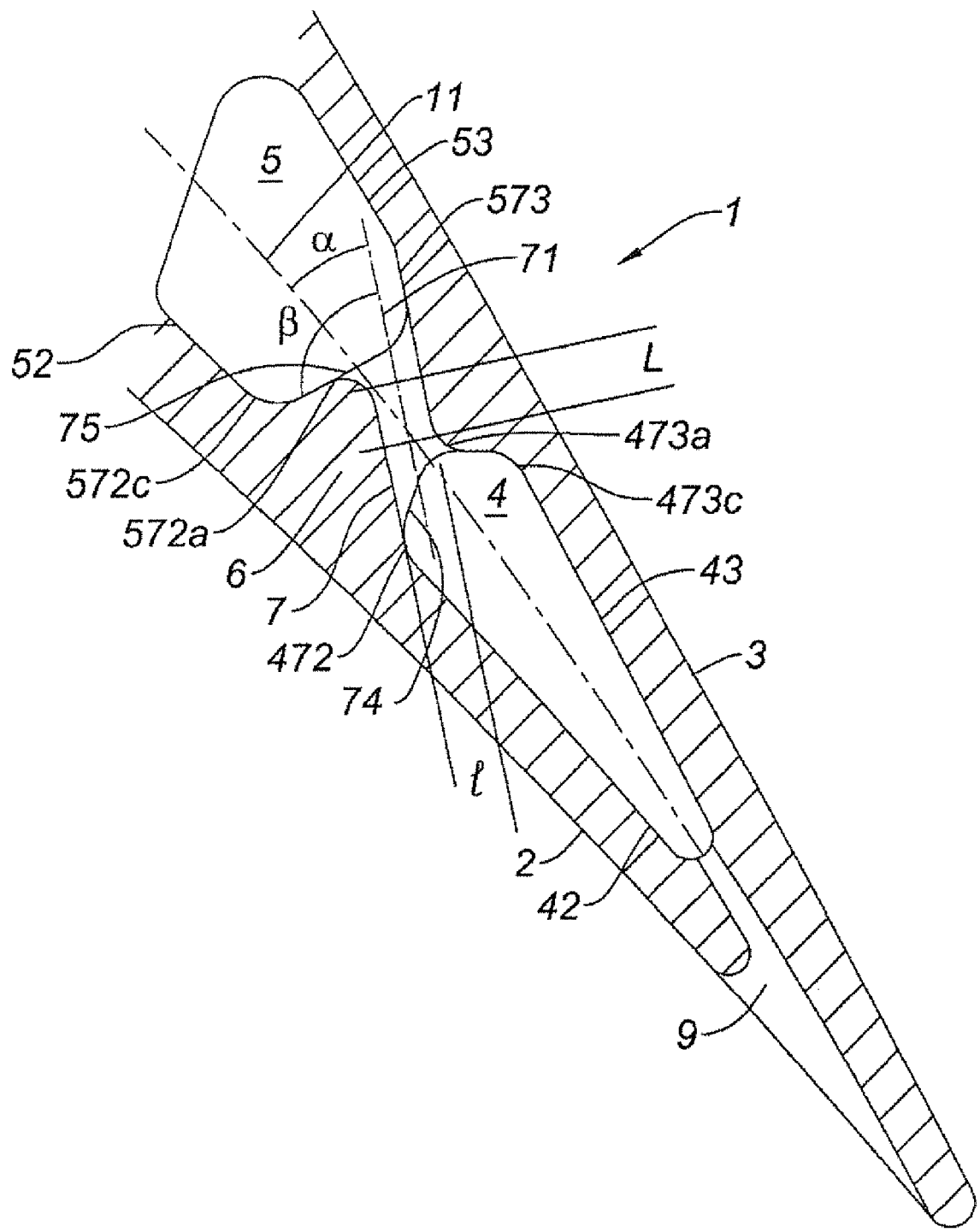
FIG. 3; a partial view of a blade sectioned in a plane perpendicular to a radial axis, according to the invention.

FIG. 3 illustrates the solution proposed by the invention in order to improve the service life of the blades, which involves providing at least one channel 7 oriented in an axis 71 intersecting the internal surface 42 of the intrados wall 2. This inclination of the axis 71 in the direction of the internal surface 42 of the intrados wall 2 advantageously permits the intrados wall 2 to be cooled more intensively than the extrados wall 3. The cooling air as it exits from these channels 7 is in effect projected directly onto the internal surface 42 of the intrados wall 2. The thermal gradient observed in the prior art between the intrados wall 2 and the extrados wall 3 is thus noticeably attenuated, which contributes to improving the mechanical strength of the blade 1 and, by the same token, its service life.

The axis 71 of each channel 7 is inclined at an angle α in relation to a tangent to a portion of the camber surface 11 of the blade 1, the said portion of the camber surface 11 being located in the interior of the channel 7, unlike the axes 81 of the channels 8 in the prior art, which are more or less parallel to this tangent. The angle α lies between 5° and 70°, and preferably between 5° and 35°, where an angle of 25° provides satisfactory results.

The narrowness of the channels 7 allows the cooling air to be projected, under the effect of the pressure inside the radial cavity 5, in such a way as to favor thermal exchanges by convection. The channels 7 are widened at their downstream 74 and upstream 75 extremities, discharging respectively into radial cavities 4 and 5. The presence of these widening points in the form of a throat to facilitate casting, causes the cooling air to be subjected to the risk of being poorly projected onto the internal surface 42 of the intrados wall 2 in the radial trailing edge cavity 4.

In order to provide effective cooling by convection, a channel 7 must exhibit a sufficient guiding length L. The guiding length is the maximum length of the channel exhibiting an approximately constant section. The guiding length L is considered to be sufficient when the ratio of the guiding length L to the guiding width 1, that is to say the width of the section in a plane perpendicular to a radial axis, is greater than 1. However, the guiding length L must be greater than the guiding width 1. This ratio is preferably greater than 1.5. This guiding length L permits effective cooling by convection of the internal surface 42 of the intrados wall 2 to be guaranteed in the first radial trailing edge cavity 4.

In order simultaneously to achieve a sufficient inclination of the axis 71 of the channel 7 and a sufficient guiding length L, but without modifying the dimensions of the radial cavities 4 and 5 excessively, the upstream extremity 75 of the channel 7 is adjacent to the internal surface 53 of the extrados wall 3 in the second radial cavity 5, and the downstream extremity 74 of the channel 7 is adjacent to the internal surface 42 of the intrados wall 2 in the first radial trailing edge cavity 4.

According to one essential characteristic feature of the invention, the upstream extremity 75 of the channel 7 is connected at its outlet in the radial cavity 5, on the one hand, to the internal surface 53 via a throat 573 having a large radius of curvature and, on the other hand, to the internal surface 52 successively via a rounded area 572a and a throat 572c having small radii of curvature, whereas the downstream extremity 74 of the channel 7 is connected at its outlet in the radial trailing edge cavity 4, on the one hand, to the internal surface 42 via a throat 472 having a large radius of curvature and, on the other hand, to the internal surface 43 successively via a rounded area 473a and a throat 473c having small radii of curvature.

The advantage of these connections is to channel the flow more effectively by means of a progressive restriction of the section of the channel. The losses of pressure are diminished in this way at the time of the flow through the channel. In documents U.S. Pat. Nos. 6,368,060 and 4,770,608, on the other hand, the channel is connected to the walls of the cavities at acute angles, such that losses in pressure are occasioned. If the pressure becomes insufficient inside the trailing edge cavity, the cooling will not be effective.

In the perpendicular plane of the partial section of the blade 1, as depicted in FIG. 3, the rounded areas 572a and 473a have the form of protuberances projecting from the internal intrados and extrados surfaces in the direction of the camber surface 11.

It is also advantageous for the surface onto which the upstream extremity 75 of the channel 7 discharges to define an angle β with the axis 71 of the channel 7 lying in the range between 90° and 120°. This arrangement facilitates the manufacture of the blade by casting and contributes to obtaining a greater guiding length L.

The radial trailing edge cavity 4 may also include perturbators on its internal surfaces 42 and 43. These perturbators are in the form of reliefs executed on the internal surfaces of the blades in order to favor thermal exchanges. The perturbators may take the form of a projecting rib or stud.

In order to provide cooling distributed uniformly over the entire height of the blade 1, the channels 7 are distributed radially along the height of the internal wall 6.

The invention claimed is:

1. A moving blade of a turbine comprising an intrados wall, an extrados wall, at least one first radial trailing edge cavity, at least one second radial cavity upstream of the trailing edge cavity, an internal wall separating the radial cavities and containing at least one channel connecting the cavities to one another, the channel being oriented in an axis intersecting the internal surface of the intrados wall in the first radial trailing edge cavity, wherein the upstream extremity of the channel is connected at its outlet in the radial cavity, on the one hand, to the internal surface of the extrados wall via a throat having an upstream extrados radius of curvature and, on the other hand, to the internal surface of the intrados wall via a rounded area and a throat having an upstream intrados of curvature, wherein said upstream extrados radius of curvature is larger than said upstream intrados radius of curvature, said throat being a vertex of an angle formed by the upstream extremity of the channel and the internal wall of the extrados wall and whereas the downstream extremity of the channel is connected at its outlet in the radial trailing edge cavity, on the one hand, to the internal surface of the intrados wall via a throat having a downstream intrados radius of curvature and, on the other hand, to the internal surface of the extrados wall via a rounded area and a throat having a downstream extrados radius of curvature, wherein said downstream intrados radius of curvature is larger than said downstream extrados radius of curvature.

2. The turbine blade as claimed in claim 1, wherein the said axis is inclined at an angle (α) in the range between 5° and 70° in relation to a tangent to a portion of a camber surface of the blade, said portion of the camber surface being located in the interior of the channel.

3. The turbine blade as claimed in claim 2, wherein said angle (α) lies in the range between 5° and 35°.

4. The turbine blade as claimed in claim 3, wherein the angle (α) is equal to 25°.

5. The turbine blade as claimed in claim 1, wherein the channel comprises a guiding length (L) and a guiding width (l), the ratio of the guiding length (L) to the guiding width (l) being greater than 1.

6. The turbine blade as claimed in claim 5, wherein the ratio of the guiding length (L) to the guiding width (l) is greater than 1.5.

7. The turbine blade as claimed in claim 1, wherein at least one internal surface of the radial trailing edge cavity includes perturbators.

8. A turbine including at least one turbine blade as claimed in claim 1.

9. A turbo machine including a turbine as claimed in claim 8.

10. The turbine blade as claimed in claim 1, wherein the upstream extremity of the channel discharges to define an angle (β) with the axis of the channel lying in a range between 90° and 120°.

* * * * *